United States Patent
Hansen et al.

(10) Patent No.: US 11,326,078 B2
(45) Date of Patent: May 10, 2022

(54) SOLVENT COMPOSITION, ADHESIVE COMPOSITION, AND METHOD OF BONDING SURFACES

(71) Applicant: THE UNIVERSITY OF MASSACHUSETTS, Boston, MA (US)

(72) Inventors: Christopher Hansen, Lowell, MA (US); Gregory Morose, Haverhill, MA (US); Catherine P. Barry, Marlborough, MA (US)

(73) Assignee: THE UNIVERSITY OF MASSACHUSETTS, Boston, MA (US)

( * ) Notice: Subject to any disclaimer, the term of this patent is extended or adjusted under 35 U.S.C. 154(b) by 95 days.

(21) Appl. No.: 16/497,840

(22) PCT Filed: Apr. 2, 2018

(86) PCT No.: PCT/US2018/025619
§ 371 (c)(1),
(2) Date: Sep. 26, 2019

(87) PCT Pub. No.: WO2018/183990
PCT Pub. Date: Oct. 4, 2018

(65) Prior Publication Data
US 2020/0040232 A1     Feb. 6, 2020

Related U.S. Application Data

(60) Provisional application No. 62/479,446, filed on Mar. 31, 2017.

(51) Int. Cl.
| | | |
|---|---|---|
| C11D 7/50 | (2006.01) | |
| C09J 11/06 | (2006.01) | |
| C09J 111/00 | (2006.01) | |
| C09J 125/10 | (2006.01) | |

(52) U.S. Cl.
CPC .............. *C09J 11/06* (2013.01); *C09J 111/00* (2013.01); *C09J 125/10* (2013.01); *C11D 7/50* (2013.01); *C11D 7/5004* (2013.01); *C11D 7/5068* (2013.01); *C09J 2203/00* (2013.01); *C09J 2409/00* (2013.01); *C09J 2411/00* (2013.01); *C09J 2425/00* (2013.01); *C11D 7/5018* (2013.01)

(58) Field of Classification Search
CPC ....... C11D 7/50; C11D 7/5004; C11D 7/5018; C11D 7/5022; C11D 7/5027; C11D 7/509; C11D 7/5068
See application file for complete search history.

(56) References Cited

U.S. PATENT DOCUMENTS

| | | | |
|---|---|---|---|
| 8,728,245 B2 | 5/2014 | Dufresne et al. | |
| 8,961,680 B2 | 2/2015 | Pasin et al. | |
| 9,221,985 B2 | 12/2015 | Pasin et al. | |
| 9,642,212 B1* | 5/2017 | Rogers | C09D 181/08 |
| 2011/0269884 A1* | 11/2011 | Yokoyama | C09D 5/024 524/315 |
| 2014/0065432 A1* | 3/2014 | Wuerch | C09J 11/06 428/447 |
| 2018/0179129 A1* | 6/2018 | Pasin | B01F 21/00 |

OTHER PUBLICATIONS

Densities, Excess Molar Volumes Isothermal Compressibilities, and Isobaric Expansivities of Dimethyl Carbonate + Cyclohexane Systems at Temperatures from (293.15 to 313.15) K and Pressures from (0.1 to 40) MPa, Zhou et al., Journal of Chemical & Engineering Data, vol. 55, No. 12, 2010.*
Excess Molar Volumes for Dimethyl Carbonate + Heptane, Decane, 2,2,4-Trimethylpentane, Cyclohexane, Benzene, Toluene, or Tetrachloromethane, de la Fuente et al., Journal of Chemical and Engineering Data, vol. 37, No. 4, 1992.*
International Search Report; International Application No. PCT/US18/25619; International Filing Date: Apr. 2, 2018 dated May 24, 2018; 4 pages.
Sanger F., "The Terminal Peptides of Insulin," Biochemical Journal, Jan. 1949, pp. 563-573, vol. 45.
Written Opinion; International Application No. PCT/US18/25619; International Filing Date: Apr. 2, 2018; dated May 24, 2018; 8 pages.

* cited by examiner

*Primary Examiner* — Haidung D Nguyen
(74) *Attorney, Agent, or Firm* — Cantor Colburn LLP

(57) ABSTRACT

In an embodiment a solvent composition can comprise, based on the total volume of the solvent composition, 10 to 95 volume percent of a first solvent, wherein the first solvent has Hansen solubility parameters of: $15 \text{ MPa}^{0.5} \leq \delta_D \leq 17 \text{ MPa}^{0.5}$, $4 \leq \delta_P \leq 10.5 \text{ MPa}^{0.5}$, and $7 \leq \delta_H \leq 10 \text{ MPa}^{0.5}$; 5 to 95 volume percent of a second solvent, wherein the second solvent has Hansen solubility parameters of: $16 \text{ MPa}^{0.5} \leq \delta_D \leq 17.5 \text{ MPa}^{0.5}$, $0 \leq \delta_P \leq 3 \text{ MPa}^{0.5}$, and $0 \leq \delta_H \leq 3 \text{ MPa}^{0.5}$; and 0 to 85 volume percent parachlorobenzotrifluoride; wherein the amounts of the first solvent, the second solvent, and parachlorobenzotrifluoride sum to at least 85 volume percent. The first solvent can comprise methyl acetate, acetone, dimethyl carbonate, ethyl acetate, n-butylamine, propyl acetate, tetrahydrofuran, or a combination thereof. The second solvent can comprise cyclohexene, cyclohexane, cyclopentane, methylcyclohexane, or a combination thereof. The solvent compositions are particularly useful in an adhesive composition. An adhesive composition includes the solvent composition, a rubber, and a tackifying resin. A method of bonding two surfaces is also described.

8 Claims, 3 Drawing Sheets

US 11,326,078 B2

SOLVENT COMPOSITION, ADHESIVE COMPOSITION, AND METHOD OF BONDING SURFACES

CROSS REFERENCE TO RELATED APPLICATIONS

This application is a National Stage application of PCT/US2018/025619, filed Apr. 2, 2018, which claims the benefit of U.S. Provisional Application No. 62/479,446, filed Mar. 31, 2017, both of which are incorporated by reference in their entirety herein.

BACKGROUND

A contact adhesive is an adhesive that only bonds to itself after it is allowed to dry on the two surfaces to be bonded. These types of adhesives can be used to bond items with large surface areas, for example plastic laminate countertops in kitchens and bathrooms or any kind of laminate that is bonded to wood or particle board. Some advantages of these types of adhesives are that they bond quickly, and have high shear strength and durability. Contact adhesives can be applied to a surface by brush or spray equipment and dry by the rapid evaporation of the solvent component. The tacky contact adhesive will bond to itself upon contact, so the adhesive must be applied to both surfaces that are to be bonded. Solvent-based contact adhesives include a solvent or solvent blend, rubber, resin, and optionally, additives. The rubber component can generally be natural rubber, butyl rubber, nitrile rubber, styrene-butadiene rubber, polychloroprene rubber, or the like. The resin is generally used to improve tack of the adhesive and additives such as antioxidants (to prevent polymer degradation from exposure to air) can be added to enhance the contact adhesive formulation.

Solvents that are used in these adhesives are often selected for function with a lesser drive for safety. Frequent use of toxic solvents in contact adhesives can detrimentally impact human health. Toluene, hexane, methyl ethyl ketone, xylene, and methylene chloride are just a few of these chemicals that are used in many commercially available contact adhesives. Exposure to the chemicals can cause human health issues such as polyneuropathy, pulmonary edema (fluid in the lungs), and some can harm the reproductive system causing birth defects. Toluene is a volatile organic compound (VOC) meaning that its vapors participate in photochemical reactions with the sun to produce smog. Long-term inhalation exposure to this chemical may permanently damage the brain causing loss of speech, hearing, muscle control, and memory. Toluene inhalation can also cause central nervous system (CNS) depression which can decrease a person's breathing and heart rate causing a coma. Hexane is another VOC chemical. It is highly flammable. Long-term inhalation exposure to hexane may lead to numbness in hands and feet, which can lead to paralysis in arms and legs, a condition known as peripheral neuropathy.

Accordingly, there is a continuing need in the art for new solvent compositions, particularly for use in contact adhesive formulations, which can overcome the above-described technical limitations of solvent compositions currently in use.

BRIEF SUMMARY

In an embodiment, a solvent composition comprises, based on the total volume of the solvent composition, 10 to 95 volume percent of a first solvent, wherein the first solvent has Hansen solubility parameters of: $15\ \mathrm{MPa}^{0.5} \leq \delta_D \leq 17\ \mathrm{MPa}^{0.5}$, $4 \leq \delta_P \leq 10.5\ \mathrm{MPa}^{0.5}$, and $7 \leq \delta_H \leq 10\ \mathrm{MPa}^{0.5}$; 5 to 95 volume percent of a second solvent, wherein the second solvent has Hansen solubility parameters of: $16\ \mathrm{MPa}^{0.5} \leq \delta_D \leq 17.5\ \mathrm{MPa}^{0.5}$, $0 \leq \delta_P \leq 3\ \mathrm{MPa}^{0.5}$, and $0 \leq \delta_H \leq 3\ \mathrm{MPa}^{0.5}$; and 0 to 85 volume percent parachlorobenzotrifluoride; wherein the amounts of the first solvent, the second solvent, and parachlorobenzotrifluoride sum to at least 85 volume percent.

In another embodiment, a solvent composition comprises, based on the total volume of the solvent composition, 10 to 95 volume percent of a first solvent, wherein the first solvent consists essentially of methyl acetate, acetone, dimethyl carbonate, ethyl acetate, n-butylamine, propyl acetate, tetrahydrofuran, or a combination thereof; 5 to 95 volume percent of a second solvent, wherein the second solvent consists essentially of cyclohexene, cyclohexane, cyclopentane, methylcyclohexane, or a combination thereof; and 0 to 85 volume percent parachlorobenzotrifluoride; wherein the amounts of the first solvent, the second solvent, and parachlorobenzotrifluoride sum to at least 85 volume percent.

Another embodiment is an adhesive composition comprising, based on the total weight of the adhesive composition, 40 to 93 weight percent of a solvent composition; 5 to 30 weight percent of a rubber; 0 to 30 weight percent, or 2 to 30 weight percent of a tackifying resin; and 0 to 10 weight percent of an additive.

Another embodiment is a method of bonding a first surface and a second surface, the method comprising, applying an adhesive composition to at least a portion of the first surface; applying an adhesive composition to at least a portion of the second surface; and contacting the adhesive composition applied to the first surface and the adhesive composition applied to the second surface; wherein the first surface and the second surface each independently comprise wood, ceramic, concrete, glass, particleboard, fiberboard, high pressure laminate, metal, leather, a textile, a polymer, cork, upholstery, linoleum, or a combination thereof.

These and other embodiments are described in detail below.

BRIEF DESCRIPTION OF THE DRAWINGS

The following Figures are of exemplary embodiments.

DETAILED DESCRIPTION

Figure 1:
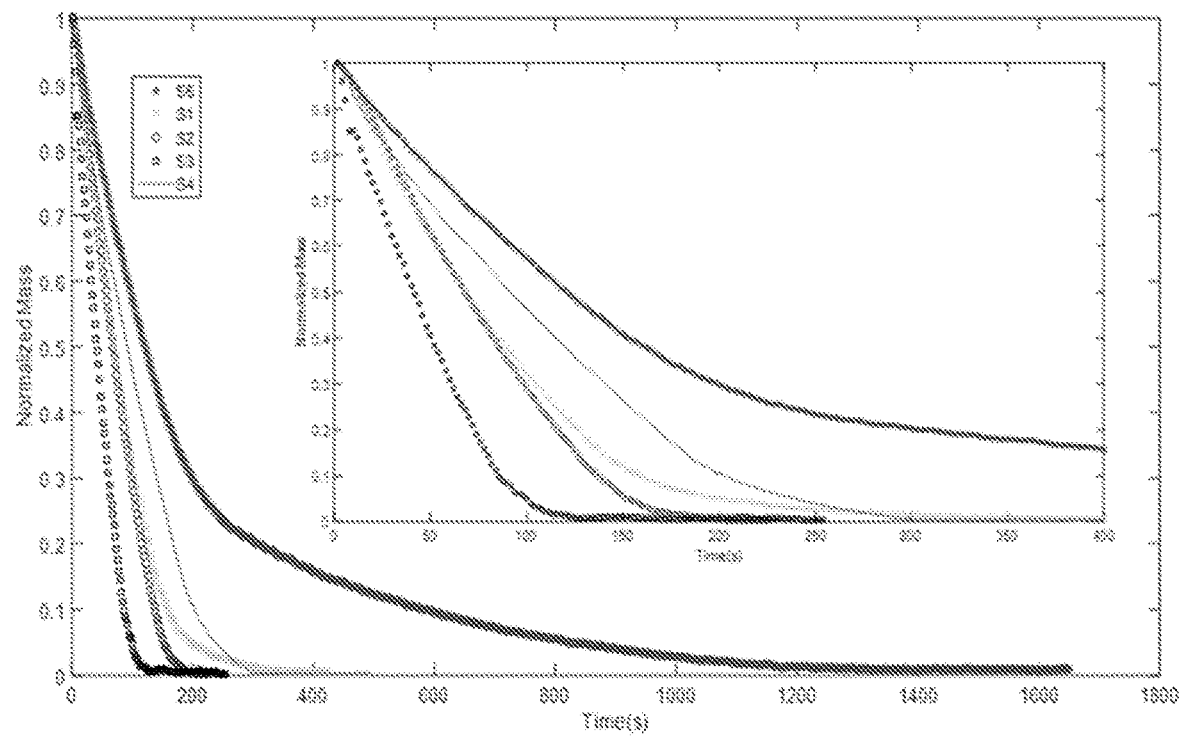
FIG. 1 shows evaporation testing results.

The present inventors have discovered new solvent compositions particularly suitable for use in contact adhesives. Suitable solvent compositions should be able to satisfactorily solubilize the various components of a contact adhesive composition. In addition to satisfying solubility criteria, alternative solvents for contact adhesives should also satisfy other physical, safety, and economic criteria. For example, new solvent compositions preferably have a high evaporation rate, low to medium odor, and are colorless. Fast evaporation is desirable to allow bonding to be fast and efficient. The odor should be mild enough so that it does not irritate the user or handler of the composition. The color can beneficially be clear to allow dying of the adhesive in order to visualize the coverage of the substrate. New solvent compositions are further preferably not on the hazardous air pollutants (HAPs) list developed and maintained by the U.S. Environmental Protection Agency (EPA). A chemical qualifies as HAP if it is known to cause cancer or other serious health impacts such as reproductive mutations. Volatile organic compound (VOC) content is another aspect that should be considered. A chemical is classified as a VOC if its vapors participate in photochemical reactions that cause smog. Many states have adopted a 250 gram per liter (g/L) limit on VOCs within a contact adhesive product. Any product containing VOCs above this limit is not allowed to be sold in states with this requirement. Lastly preferred solvent compositions should be readily available and be economically efficient (e.g., have a low cost per pound).

Accordingly, one aspect of the present disclosure is a solvent composition. The solvent composition can be particularly suitable for use in a contact adhesive composition. Thus, the solvent composition comprises a particular combination of solvents. Specifically, the solvent composition comprises a first solvent and a second solvent. The first solvent and the second solvent can be selected based on their Hansen solubility parameters. There are three Hansen solubility parameters. While not wanting to be bound by theory, $\delta_D$ is understood to characterize the energy from dispersion forces between molecules, $\delta_P$ is understood to characterize the energy from dipolar intermolecular force between molecules, and $\delta_H$ is understood to characterize the energy from hydrogen bonds between molecules. While theory, these values are well established and can be found in many databases. The first solvent can have Hansen solubility parameters of $15\ \text{MPa}^{0.5} \leq \delta_D \leq 17\ \text{MPa}^{0.5}$, $4 \leq \delta_P \leq 10.5\ \text{MPa}^{0.5}$, or $7 \leq \delta_H \leq 10\ \text{MPa}^{0.5}$; where the Hansen solubility parameters can be $15\ \text{MPa}^{0.5} \leq \delta_D \leq 17\ \text{MPa}^{0.5}$, $5 \leq \delta_P \leq 9\ \text{MPa}^{0.5}$, or $7 \leq \delta_H \leq 8\ \text{MPa}^{0.5}$. The second solvent can have Hansen solubility parameters of $16\ \text{MPa}^{0.5} \leq \delta_D \leq 17.5\ \text{MPa}^{0.5}$, $0 \leq \delta_P \leq 3\ \text{MPa}^{0.5}$, or $0 \leq \delta_H \leq 3\ \text{MPa}^{0.5}$, where the Hansen solubility parameters can be $16\ \text{MPa}^{0.5} \leq \delta_D \leq 17\ \text{MPa}^{0.5}$, $1 \leq \delta_P \leq 3\ \text{MPa}^{0.5}$, or $1 \leq \delta_H \leq 3\ \text{MPa}^{0.5}$.

The first solvent can comprise methyl acetate, acetone, dimethyl carbonate, ethyl acetate, n-butylamine, propyl acetate, tetrahydrofuran, or a combination thereof. The second solvent can comprise cyclohexene, cyclohexane, cyclopentane, methylcyclohexane, or a combination thereof. The solvent composition can optionally comprise parachlorobenzotrifluoride (also known as 1-chloro-4-(trifluoromethyl)benzene, CAS Reg. No. 98-56-6).

In some embodiments, the first solvent consists of methyl acetate, acetone, dimethyl carbonate, ethyl acetate, n-butylamine, propyl acetate, tetrahydrofuran, or a combination thereof. In some embodiments, the first solvent consists of at least one of methyl acetate, acetone, or a combination thereof. In some embodiments, the second solvent consists of cyclohexene, cyclohexane, cyclopentane, methylcyclohexane, or a combination thereof. In some embodiments, the second solvent consists of cyclohexene, cyclohexane, methylcyclohexane, or a combination thereof. In some embodiments, no parachlorobenzotrifluoride (0 wt %) is present in the solvent composition.

The first solvent can be present in the solvent composition in an amount of 10 to 95 volume percent, or 10 to 90 volume percent, or 10 to 80 volume percent, or 10 to 75 volume percent, of 20 to 75 volume percent, or 40 to 70 volume percent, or 45 to 65 volume percent, based on the total volume of the solvent composition. The second solvent can be present in the solvent composition in an amount of 5 to 95 volume percent, or 10 to 90 volume percent, or 10 to 85 volume percent, or 10 to 60 volume percent, or 15-55 volume percent, based on the total volume of the solvent composition. Parachlorobenzotrifluoride (PCBTF) can be present in the solvent composition in an amount of 0 to 85 volume percent, or greater than 0 to 85 volume percent, or 1 to 75 volume percent, or 5 to 50 volume percent, or 5 to 25 volume percent, or 10 to 20 volume percent, based on the total volume of the solvent composition.

The total amounts of the first solvent, the second solvent, and PCBTF sum to at least 85 volume percent, at least 90 volume percent, or at least 92 volume percent, or at least 95 volume percent, or at least 97 volume percent, or at least 98 volume percent, or at least 99 volume percent, or to 100 volume percent based on the total amount of the solvent composition.

In some embodiments, the solvent composition can be substantially free of certain solvents. As used herein, the term "substantially free" means that the solvent composition includes less than or equal to 10 volume percent, or less than or equal to 5 volume percent, or less than or equal to 1 volume percent, or less than or equal to 0.5 volume percent, or less than or equal to 0.1 volume percent of the recited solvent based on the total volume of the solvent composition. For example, in some embodiments, the composition can be substantially free of methylene chloride, hexane, toluene, or a combination thereof. In some embodiments, the solvent composition can comprise less than or equal to 1 volume percent of methylene chloride, methyl ethyl ketone, hexane, toluene, xylene, methanol, n-propyl bromide, or a combination thereof. For example, if the solvent composition comprises methylene chloride and methyl ethyl ketone, then the solvent composition can comprise less than or equal to 1 volume percent of each of the respective solvents, (for example, less than or equal to 1 volume percent methylene chloride and less than or equal to 1 volume percent of methyl ethyl ketone); or the composition can comprise less than or equal to 1 volume percent of a total of amount of the listed solvents (for example, less than or equal 1 volume percent of the total amount of methylene chloride and methyl ethyl ketone). In some embodiments, the solvent composition can exclude a particular solvent, for example the solvent composition can exclude (0 volume percent) methylene chloride, hexane, toluene, or a combination thereof (i.e., no methylene chloride, hexane, toluene, or a combination thereof is present in the solvent composition). In some embodiments, the solvent composition can exclude solvents other than methyl acetate, acetone, dimethyl carbonate, ethyl acetate, n-butylamine, propyl acetate, tetrahydrofuran, cyclohexene, cyclohexane, cyclopentane, methylcyclohexane, and parachlorobenzotrifluoride.

In an embodiment, the solvent composition comprises, based on the total volume of the solvent composition, 10 to 76 volume percent, or 45 to 60 volume percent methyl acetate, 24 to 90 volume percent, or 24 to 71 volume percent, or 27 to 71 volume percent, or 30 to 45 volume percent cyclohexene, and 0 to 66 volume percent, or 0 to 32 volume percent, or 10 to 25 volume percent methylcyclohexane. The amounts of methyl acetate, cyclohexene, and methylcyclohexane can sum to at least 90 volume percent, or at least 92 volume percent, or at least 95 volume percent, or at least 97 volume percent, or at least 98 volume percent, or at least 99 volume percent based on the total volume of the solvent composition.

In an embodiment, the solvent composition comprises, based on the total volume of the solvent composition, 6 to 72 volume percent, or 19 to 72 volume percent, or 50 to 60 volume percent methyl acetate, and 28 to 94 volume percent, or 28 to 81 volume percent, or 40 to 50 volume percent cyclohexene. The amounts of methyl acetate and cyclohexene can sum to at least 90 volume percent, or at least 92 volume percent, or at least 95 volume percent, or at least 97 volume percent, or at least 98 volume percent, or at least 99 volume percent based on the total volume of the solvent composition.

In an embodiment, the solvent composition comprises, based on the total volume of the solvent composition, 23 to 59 volume percent, or 45 to 55 volume percent acetone, and 41 to 77 volume percent, or 45 to 55 volume percent cyclohexane. The amounts of methyl acetate and cyclohexane can sum to at least 90 volume percent, or at least 92 volume percent, or at least 95 volume percent, or at least 97 volume percent, or at least 98 volume percent, or at least 99 volume percent based on the total volume of the solvent composition.

In an embodiment, the solvent composition comprises, based on the total volume of the solvent composition, 9 to 66 volume percent, or 15 to 30 volume percent methyl acetate, 4 to 61 volume percent, or 25 to 40 volume percent acetone, and 30 to 87 volume percent, or 45 to 60 volume percent cyclohexane. The amounts of methyl acetate, acetone, and cyclohexane can sum to at least 90 volume percent, or at least 92 volume percent, or at least 95 volume percent, or at least 97 volume percent, or at least 98 volume percent, or at least 99 volume percent based on the total volume of the solvent composition.

In an embodiment, the solvent composition comprises, based on the total volume of the solvent composition, 8 to 80 volume percent, or 56 to 66 volume percent methyl acetate, 9 to 78 volume percent, or 9 to 21 volume percent cyclohexane, and 11 to 83 volume percent, or 18 to 28 volume percent parachlorobenzotrifluoride. The amounts of methyl acetate, acetone, cyclohexane, and parachlorobenzotrifluoride can sum to at least 90 volume percent, or at least 92 volume percent, or at least 95 volume percent, or at least 97 volume percent, or at least 98 volume percent, or at least 99 volume percent based on the total volume of the solvent composition.

The solvent compositions described herein can be particularly useful for adhesive compositions, for example contact adhesive compositions. Thus, another aspect of the present disclosure is an adhesive composition. The adhesive composition comprises the above-described solvent composition, a rubber, an optional tackifying resin, and optionally, an additive. The adhesive composition can include the solvent composition in an amount of 40 to 93 weight percent, or 50 to 93 weight percent, or 55 to 93 weight percent, based on the total weight of the adhesive composition.

In addition to the solvent composition, the adhesive composition includes a rubber. In some embodiments, the rubber can comprise polychloroprene, poly(styrene)-poly(isoprene)-poly(styrene), poly(styrene)-poly(butadiene)-poly(styrene), poly(styrene)-poly(ethylene)-poly(butadiene)-poly(styrene), poly(styrene)-poly(ethylene)-poly(propylene)-poly(styrene), natural rubber, synthetic polyisoprene, polybutadiene, poly(isobutylene-co-isoprene), poly(ethylene-co-propylene), poly(styrene-co-isoprene-co-butadiene), poly(isoprene-co-butadiene), poly(ethylene-co-propylene-co-diene), polysulfide rubber, acrylic rubber, urethane rubber, silicone rubber, nitrile rubber, epichlorohydrin rubber, acrylonitrile-butadiene-styrene rubber, or a combination thereof. In some embodiments, the rubber comprises polychloroprene, poly(styrene)-poly(isoprene)-poly(styrene), poly(styrene)-poly(butadiene)-poly(styrene), or a combination thereof. In some embodiments, the rubber comprises polychloroprene. In some embodiments, the rubber comprises poly(styrene)-poly(isoprene)-poly(styrene) (SIS), poly(styrene)-poly(butadiene)-poly(styrene) (SBS), or a combination thereof. In some embodiments, the rubber comprises poly(styrene)-poly(isoprene)-poly(styrene) (SIS). In some embodiments, when the rubber comprises a styrene containing rubber, the total styrene content of the rubber component can be 5 to 45 weight percent, or 5 to 30 weight percent, based on the total weight of the rubber component.

The rubber can be present in the adhesive composition in an amount of 5 to 30 weight percent, or 5 to 25 weight percent, based on the total weight of the adhesive composition. In some embodiments, the rubber can have a styrene content of 5 to 45 weight percent, or 10 to 40 weight percent, or 20 to 40 weight percent, or 25 to 35 weight percent, or 5 to 30 weight percent, based on the total weight of the rubber component.

In addition to the solvent composition and the rubber, the adhesive composition can further comprise a tackifying resin. Tackifying resins can include, for example, hydrocarbon resins, phenolic resins, or a combination thereof.

Exemplary hydrocarbon resins can include aliphatic hydrocarbon resins, hydrogenated aliphatic hydrocarbon resins, aliphatic/aromatic hydrocarbon resins, hydrogenated aliphatic/aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins, rosin esters, hydrogenated rosins and rosin esters, or a combination thereof. As used herein, "hydrogenated", when referring to the hydrocarbon resin, includes at least one of fully, substantially, or partially hydrogenated resins. Suitable aromatic resins include aromatic modified aliphatic resins, aromatic modified cycloaliphatic resins, or hydrogenated aromatic hydrocarbon resins having an aromatic content of about 1 to about 30 weight percent based on the total weight of the aromatic resin. Any of the above resins can be grafted with an unsaturated ester or anhydride using methods known in the art. Such grafting can provide enhanced properties to the resin. In some embodiments, the hydrocarbon resin comprises an aromatic-modified aliphatic hydrocarbon resin, a cycloaliphatic hydrocarbon resin, an aromatic modified cycloaliphatic hydrocarbon resin, an aliphatic hydrocarbon resin, or a combination thereof. Suitable hydrocarbon resins are commercially available and include, for example, ESCOREZ resins available from Exxon Chemicals, WINGTACK resins available from Goodyear Chemical Company, and EASTOTAC resins, PICCOTAC resins, REGALITE and REGALREZ hydrogenated cycloaliphatic/aromatic resins, and PICCOLYTE and PERMALYN polyterpene resins, rosins, and rosin esters available from Eastman Chemical Company. In some embodiments, the hydrocarbon resins have softening points of about 80 to about 180° C., specifically about 100 to about 170° C., more specifically about 110 to about 150° C., and still more specifically about 120 to about 130° C. Softening point is measured as a ring and ball softening point according to ASTM E28-99.

Exemplary phenolic resins can include alkylphenolic resins, reaction products of alkylphenols and formaldehyde, terpene phenolic resins, phenol-aldehyde resins, or a combination thereof. Phenolic resins, which can be utilized include phenol formaldehyde resins, particularly para-alkylated phenol formaldehyde resins such as para-tertiary butyl phenol formaldehyde, para-tertiary-amyl phenol formaldehyde, para-octyl-phenol formaldehyde, para-tertiary-octyl phenol formaldehyde, para-nonylphenol formaldehyde, para-dodecyl phenol formaldehyde, or a combination thereof. An exemplary para-alkylated phenol formaldehyde resin is a para-tertiary-octyl phenol formaldehyde resin having a ring and ball softening point of 108-124° C., available from PMC Specialties Group, Inc., under the designation DYPHENE 8320. Terpene-modified phenolics, for example, can be prepared by condensing terpene hydrocarbons or alcohols with phenol in the presence of an acid catalyst, followed by resinification of the modified phenol with formaldehyde. The phenolaldehyde resins from p-substituted phenols can be prepared by reacting 1 mole of phenol with about 1 to 2 moles of formaldehyde in the presence of an alkaline condensation catalyst. Phenols having alkyl groups of 3 to 8 carbon atoms as p substituted are particularly useful for preparing these resins. Examples of such phenols include p-isopropyl phenol, p-tertiary butyl phenol, p-cyclohexyl phenol, p-tertiary amyl phenol, and p-octyl phenol. Exemplary phenolic resins are commercially available and can include, for example, alkylphenolic resins available as P-126 Resin from Akrochem Corporation; CRJ-418, FRJ-551, HFJ-11995, HRJ-11041, HRJ-2765, and HRJ-1367 from Schenectady Chemicals, Inc.

The tackifying resin can be present in the adhesive composition in an amount of 0 to 30 weight percent, 2 to 30 weight percent, or 2 to 25 weight percent, or 5 to 25 weight percent, based on the total weight of the adhesive composition.

In some embodiments, the adhesive composition can further comprise an additive. The additive can be selected to achieve a desired property, with the proviso that the additive is also selected so as not to significantly adversely affect a desired property of the adhesive composition. The additive can comprise propellants, antioxidants, thickeners, corrosion inhibitors, surfactants, preservatives, dyes, pigments, fillers, curatives, fragrances, activators, or a combination thereof. In some embodiments, the adhesive composition preferably comprises an antioxidant. Antioxidants can be added to protect the adhesive composition from degradation induced by heat, light and processing or during storage. Several types of antioxidants can be used, either primary antioxidants like hindered phenols or secondary antioxidants like phosphite derivatives or blends thereof. Examples of commercially available antioxidants are IRGANOX 565 from Ciba-Geigy (2.4-bis-(n-octylthio)-6-(4-hydroxy-3,5-di-tertiarybutyl anilino)-1,3,5-triazine), IRGANOX 1010 from Ciba-Geigy (tetrakis-ethylene-(3,5-di-tertiary-butyl-4-hydroxy-hydrocinnamate)methane), POLYGARD HR from Uniroyal (tris-(2,4-di-tertiary-butyl-phenyl)phosphite), NAUGARD 445 from Addivant (bis[4-(2-phenyl-2-propyl) phenyl]amine), NAUGARD P from Addivant (tris(mono-nonylphenyl)phosphite), and TINUVIN P from BASF (2-(2H-benzotriazol-2-yl)-p-cresol.

When present, the additive can be included in the adhesive composition in an amount of greater than 0 to 10 weight percent, or 0.1 to 10 weight percent, or 1 to 10 weight percent, or 0.1 to 5 weight percent; or 0.25 to 5 weight percent, or 2 to 5 weight percent, based on the total weight of the adhesive composition.

In some embodiments, the solvent composition of the adhesive composition can be selected in order to optimize dissolution of the rubber, the optional tackifying resin, or both. For example, in an embodiment, an adhesive composition includes, based on the total weight of the adhesive composition, 55 to 90 weight percent of the solvent composition, 5 to 20 weight percent of a rubber comprising polychloroprene, poly(styrene)-poly(isoprene)-poly(styrene), poly(styrene)-poly(butadiene)-poly(styrene), or a combination thereof, and 5 to 25 weight percent of a hydrocarbon resin, a phenolic resin, or a combination thereof, and 0 to 10 weight percent additives. In this embodiment, the solvent composition comprises, based on the total volume of the solvent composition, 10 to 76 volume percent, or 45 to 60 volume percent methyl acetate, or 24 to 90 volume percent, or 24 to 71 volume percent, or 27 to 71 volume percent, or 30 to 45 volume percent cyclohexene, and 0 to 64 volume percent, or 0 to 32 volume percent, or 10 to 25 volume percent methyl cyclohexane. The amounts of methyl acetate, cyclohexene, and methylcyclohexane sum to at least 90 volume percent, or at least 92 volume percent, or at least 95 volume percent, or at least 97 volume percent, or at least 98 volume percent, or at least 99 volume percent based on the total volume of the solvent composition.

In another embodiment, an adhesive composition includes, based on the total weight of the adhesive composition, 55 to 75 weight percent of the solvent composition, 10 to 20 weight percent of a rubber comprising poly(styrene)-poly(isoprene)-poly(styrene), poly(styrene)-poly(butadiene)-poly(styrene), or a combination thereof, and 15 to 25 weight percent of a hydrocarbon resin, and 0 to 10 weight percent additives. In this embodiment, the solvent composition comprises, based on the total volume of the solvent composition, 10 to 78 volume percent, or 45 to 60 volume percent methyl acetate, 22 to 71 volume percent, or 30 to 45 volume percent cyclohexene, and 0 to 68 volume percent, or 10 to 25 volume percent methylcyclohexane. The amounts of methyl acetate, cyclohexene, and methylcyclohexane sum to at least 90 volume percent, or at least 92 volume percent, or at least 95 volume percent, or at least 97 volume percent, or at least 98 volume percent, or at least 99 volume percent based on the total volume of the solvent composition.

In another embodiment, an adhesive composition includes, based on the total weight of the adhesive composition, 55 to 90 weight of the solvent composition, 5 to 20 weight percent of a rubber comprising polychloroprene, poly(styrene)-poly(isoprene)-poly(styrene), poly(styrene)-poly(butadiene)-poly(styrene), or a combination thereof, and 5 to 25 weight percent of a hydrocarbon resin, a phenolic resin, or a combination thereof, and 0 to 10 weight percent additives. In this embodiment, the solvent composition includes, based on the total volume of the solvent composition, 6 to 72 volume percent, or 19 to 72 volume percent, or 50 to 60 volume percent methyl acetate and 28 to 94 volume percent, or 28 to 81 volume percent, or 40 to 50 volume percent cyclohexene. The amounts of methyl acetate and cyclohexene sum to at least 90 volume percent, or at least 92 volume percent, or at least 95 volume percent, or at least 97 volume percent, or at least 98 volume percent, or at least 99 volume percent based on the total volume of the solvent composition.

In another embodiment, an adhesive composition includes, based on the total weight of the adhesive composition, 55 to 75 weight percent of the solvent composition, 10 to 20 weight percent of a rubber comprising poly(styrene)-poly(isoprene)-poly(styrene), poly(styrene)-poly(butadiene)-poly(styrene), or a combination thereof, and 15 to 25 weight percent of a hydrocarbon resin, and 0 to 10 weight percent additives. In this embodiment, the solvent composition comprises, based on the total volume of the solvent composition, 17 to 74 volume percent, or 50 to 60 volume percent methyl acetate, and 26 to 83 volume percent, or 40 to 50 volume percent cyclohexene. The amounts of methyl acetate and cyclohexene sum to at least 90 volume percent, or at least 92 volume percent, or at least 95 volume percent, or at least 97 volume percent, or at least 98 volume percent, or at least 99 volume percent based on the total volume of the solvent composition.

In another embodiment, an adhesive composition includes, based on the total weight of the adhesive composition, 80 to 93 weight percent of the solvent composition, 5 to 18 weight percent of a polychloroprene rubber, and 2 to 15 weight percent of a phenolic resin, and 0 to 10 weight percent additives. The solvent composition comprises, based on the total volume of the solvent composition, 23 to 59 volume percent, or 45 to 55 volume percent acetone and 41 to 77 volume percent, or 45 to 55 volume percent cyclohexane. The amounts of acetone and cyclohexane sum to at least 90 volume percent, or at least 92 volume percent, or at least 95 volume percent, or at least 97 volume percent, or at least 98 volume percent, or at least 99 volume percent based on the total volume of the solvent composition.

In another embodiment, an adhesive composition includes, based on the total weight of the adhesive composition, 60 to 77 weight percent of the solvent composition, 15 to 25 weight percent of a rubber comprising poly(styrene)-poly(isoprene)-poly(styrene), poly(styrene)-poly(butadiene)-poly(styrene), or a combination thereof and 8 to 18 weight percent of a hydrocarbon resin, and 0 to 10 weight percent additives. The solvent composition comprises, based on the total volume of the solvent composition, 9 to 66 volume percent, or 15 to 30 volume percent methyl acetate, 4 to 61 volume percent, or 25 to 40 volume percent acetone, and 30 to 87 volume percent, or 45 to 60 volume percent cyclohexane. The amounts of methyl acetate, acetone, and cyclohexane sum to at least 90 volume percent, or at least 92 volume percent, or at least 95 volume percent, or at least 97 volume percent, or at least 98 volume percent, or at least 99 volume percent based on the total volume of the solvent composition.

In another embodiment, an adhesive composition includes, based on the total weight of the adhesive composition, 60 to 75 weight percent of the solvent composition, 15 to 25 weight percent of a rubber comprising poly(styrene)-poly(isoprene)-poly(styrene), poly(styrene)-poly(butadiene)-poly(styrene), or a combination thereof, and 10 to 20 weight percent of a hydrocarbon resin, and 0 to 10 weight percent additives. The solvent composition comprises, based on the total volume of the solvent composition, 8 to 80 volume percent, or 56 to 66 volume percent methyl acetate, 9 to 78 volume percent, or 9 to 21 volume percent cyclohexane, and 11 to 83 volume percent, or 18 to 28 volume percent parachlorobenzotrifluoride. The amounts of methyl acetate, cyclohexane, and parachlorobenzotrifluoride sum to at least 90 volume percent, or at least 92 volume percent, or at least 95 volume percent, or at least 97 volume percent, or at least 98 volume percent, or at least 99 volume percent based on the total volume of the solvent composition.

The adhesive composition can exhibit one or more desirable properties. For example, in some embodiments, the adhesive composition can exhibit a cleavage strength of 100 to 500 newtons, or 150 to 500 newtons, or 175 to 450 newtons, or 200 to 450 newtons, or 220 to 450 newtons after 1 day of aging. The cleavage strength, also referred to as bond strength, can be determined for example using an edge-lift standard, for example according to A-A-1936, a common contact adhesive specification used for commercial and military applications. In some embodiments, the adhesive composition can further advantageously be colorless. In some embodiments, the adhesive composition can have an evaporation dry time of 1 to 10 minutes, preferably 2 to 5 minutes. In some embodiments, the adhesive composition can have an open window time of up to 60 minutes (i.e., after sufficient dryness of the composition has been obtained, the adhesive composition can be effective to adhere two surfaces for up to 60 minutes).

In some embodiments, the adhesive composition can be a sprayable composition. For example, the adhesive composition can have a viscosity effective to allow spraying of the adhesive composition. The adhesive composition can have a viscosity of less than 2000 centipoise (cP), or less than 1500 cP, or less than 1000 cP, or less than 500 cP. Within this range, the adhesive composition can have a viscosity of greater than or equal to 1 cP, or greater than or equal to 25 cP, or greater than or equal to 50 cP. In some embodiments, the adhesive composition can have a viscosity of 50 to 1000 cP, or 100 to 600 cP, or 150 to 500 cP.

Another aspect of the present disclosure is a method of bonding a first surface and a second surface. The method comprises applying an adhesive composition to at least a portion of the first surface, and applying an adhesive composition to at least a portion of the second surface, wherein the adhesive composition is as described above. Preferably, the same adhesive composition is applied to both the first and second surfaces. The method further comprises contacting the adhesive composition applied to the first surface and the adhesive composition applied to the second surface. The contacting results in the bonding of the first and second surfaces via the adhesive layer. In some embodiments, the contacting occurs 10 minutes to 1 hour after applying the adhesive composition to the first and second surfaces.

The first and second surfaces can each independently comprise a metal, a ceramic, concrete, glass, a polymer (for example, an elastomer) (for example, in the form of a textile or a foam), or a combination thereof. The first and second surfaces can each independently comprise a composite or hybrid material. The first and second surfaces can each independently comprise wood, particleboard, fiberboard, high pressure laminate, metal, leather, a textile (for example, a fabric or a cloth), polymer (for example, plastic or rubber), cork, upholstery, linoleum, or a combination thereof.

The compositions and methods disclosed herein are further illustrated by the following non-limiting examples.

EXAMPLES

The solvent compositions used for the following examples are summarized in Table 1. The amount of each component is listed in weight percent based on the total weight of the solvent composition. The solvent compositions S1-S5 were compared to various solvent compositions SA-SG.

TABLE 1

| | S1 | S2 | S3 | S4 | S5 | SA | SB | SC | SD | SE | SF | SG |
|---|---|---|---|---|---|---|---|---|---|---|---|---|
| Methyl Acetate | 54 | 58 | | | 23 | 61 | 96 | 96 | 83 | 82 | 69 | 90 |
| Acetone | | | 52 | 29 | | | | | | 13 | 88 | |
| Cyclohexane | | | 48 | 48 | 16 | | | | | 18 | 12 | 7 |
| Cyclohexene | 33 | 42 | | | | 2 | 4 | 9 | 18 | | | |
| Methyl Cyclohexane | 13 | | | | | 2 | | 8 | | | | |
| Parachlorobenzotrifluoride | | | | 23 | | | | | | | | 3 |

Solubility Testing: The solvent solutions were tested for their ability to solubilize various rubbers and resins. Ten milliliters of each solvent solution according to the present disclosure (1-5 and A-G, shown in Table 1, above) was placed in a 20 milliliter scintillation vial. The rubbers tested were polychloroprene rubber and a poly(styrene)-poly(isoprene)-poly(styrene) (SIS) rubber, shown as "Rubber 1" and "Rubber 2", respectively in Table 2. The resins tested were an alkylphenolic resin and a hydrocarbon resin, shown as "Resin 1" and "Resin 2" respectively, in Table 2. The amounts of each of the solvent component, the rubber, and the resin added to the vial are shown in Table 2. Each of the vials was shaken at 90 rpm on a platform shaker (New Brunswick Scientific C1). Every 30 minutes the vials were shaken by hand for 30 seconds to disperse agglomerated components, then returned to the platform shaker. The time was noted at which the components completely dissolved. Results of solubility testing for each solution are shown in Table 2. As shown in Table 2, the solutions S1-S5 were able to dissolve the various rubbers and resins tested, with the time for dissolution to occur ranging from 0.05 to 6.4 hours (3 minutes to 6 hours 24 minutes) depending on the solution and the rubber or resin being tested. In contrast, solutions SA-SG were unable to dissolve the tested Rubber 1, Rubber 2 and Resin 2. Additionally, solutions SC, SD, SE, and SG were unable to dissolve Resin 1, however, solutions SA, SB and SF were able to dissolve Resin 1 between 0.083-0.1 hour.

TABLE 2

| | E1 | E2 | E3 | E4 | E5 | E6 | E7 |
|---|---|---|---|---|---|---|---|
| Solution | | | | | | | |
| S1 (mL) | 10 | 10 | | | | | |
| S2 (mL) | | | 10 | 10 | | | |
| S3 (mL) | | | | | 10 | | |
| S4 (mL) | | | | | | 10 | |
| S5 (mL) | | | | | | | 10 |
| Rubber/Resin | | | | | | | |
| Rubber 1/Resin 1 (g) | 1.62 | | 1.64 | | 1.38 | | |
| Rubber 2/Resin 2 (g) | | 4.71 | | 4.78 | | 4.12 | 4.10 |
| Time to Dissolve (h) | <5.067 | <1.18 | <5.067 | <0.98 | <4.37 | <6.4 | <1.37 |

Evaporation Testing: Solvent solutions in which the rubber and resin fully dissolved (S1-S5) were tested for their evaporation rates. A balance was used to record the sample mass as a function of time. A sample of formulated contact adhesive (0.15 to 0.30 grams) was added to an aluminum weight boat, and the weight was recorded and monitored over time until reaching a plateau value.

The evaporation testing results are shown in FIG. 1. FIG. 1 shows solutions 1, 2, 3 and 4 evaporating within 5 minutes. Solution 5 evaporated after about 20 minutes. The inset of FIG. 1 shows an expanded view of the change in mass overtime for the first 400 seconds of evaporation for each of the solvent compositions analyzed.

Adhesive Mixing and Rheology: One gallon (3.74 liters; 2400 grams) of adhesive was prepared. The adhesive was prepared by addition of the required ratios of rubber, and resin to a mixing container, to which the solvent composition was subsequently added. An additive composition was also included. For examples based on Rubber 2 and Resin 2 (E8, E10, and E13-14, shown in Table 3), the additive composition included an aromatic amine type antioxidant; (3.9 grams; about 36.4 wt % based on the total weight of the additive composition), a phosphate based antioxidant (2.6 grams; about 24.3 wt % based on the total weight of the additive composition), a phenolic oxidant (3.9 grams; about 36.4 wt % based on the total weight of the additive composition), and a hydroxyphenol antioxidant (0.3 grams; about 2.9 wt % based on the total weight of the additive composition). For examples based on Rubber 1 and Resin 1 (E9, E11, and E12, shown in Table 3), the additive composition included a polymerized antioxidant (4.9 grams; about 10.6 wt % based on the total weight of the additive composition), a magnesium oxide filler (14.8 grams; about 32 wt % based on the total weight of the additive composition), a zinc oxide curative (12.3 grams; about 26.6 wt % based on the total weight of the additive composition), a C9 aromatic hydrocarbon resin (12.3 grams; about 26.6 wt % based on the total weight of the additive composition), and ammonium hydroxide (2 grams; about 4.2 wt % based on the total weight of the additive composition). The adhesive formulations are shown in Table 3. The amount of each component is shown in weight percent, based on the total weight of the solvent composition, the rubber and resin composition, and the additive composition.

The containers were sealed and mixed by rolling overnight. If the adhesive appeared non-homogenous after mixing, it was further mixed via mechanical shearing at 3800 to 7600 rpm using an industrial mixer, after which solvent was added to replace any lost solvent as needed. The containers were remixed by roll mixing to form a homogenous mixture. The viscosity of the adhesive was then measured at 25° C. using a Brookfield viscometer to determine suitability of the adhesive for spray application. The results of the viscosity testing are also shown in Table 3.

As used herein, the viscosity was determined using a Brookefield viscometer (RVT), using "Spindle 1" at a revolution rate of 20 revolutions per minute.

TABLE 3

| (wt %) | E8 | E9 | E10 | E11 | E12 | E13 | E14 |
|---|---|---|---|---|---|---|---|
| S1 | 64.7 | 83 | | | | | |
| S2 | | | 64.7 | 83 | | | |
| S3 | | | | | 83 | | |
| S4 | | | | | | 66 | |
| S5 | | | | | | | 69.9 |
| Rubber 1/Resin 1 | | 15 | | 15 | 15 | | |
| Rubber 2/Resin 2 | 34.8 | | 34.8 | | | 33.5 | 29.7 |
| Additive Composition | 0.5 | 2 | 0.5 | 2 | 2 | 0.5 | 0.4 |
| Brookfield Viscosity | 32 | 35 | 50 | 97 | 52 | 72 | 61 |
| Viscosity (cP) | 160 | 175 | 250 | 485 | 260 | 360 | 305 |

As shown in Table 3, the contact adhesive composition prepared from solvent compositions S1-S5 exhibited viscosities of 160 to 485 cP.

Spray Testing: A red dye (6 drops) was added to the adhesive compositions of Table 3 so that the adhesive spray pattern could be easily seen. The adhesive was loaded into a Binks Spray gun. A series of adjustments were made to determine nozzle and pot pressures that generated similar spray patterns and coverage between the new solutions and the baseline formulations. For adhesive compositions including Rubber 2, the spray gun was set to 100 pounds per square inch (psi) of air pressure in the nozzle and 13 psi of pot pressure. For adhesive compositions including Rubber 1, the air pressure in the nozzle was set to 40 psi and the pot pressure was set to 6 psi.

Mechanical Testing: The adhesive was tested for its ease of application, the duration of the open time and its bond strength. Bond characterization was performed on standard consumer particleboard substrates and high pressure decorative laminates (HPDL). Six 4.125 inch (in)×6 in particle boards and twelve 4.125 in×3.125 in plastic laminates were sprayed over an exposed area of 4.125 in×2.0 in. The open time of the baseline formulations occurs after 10 minutes. Three laminates were bonded to the particle board at this time; subsequent samples of the three laminates were bonded 15 min, 30 min and 60 min after this point. The HPL laminate uplift was tested on a universal testing machine (Instron). The crosshead speed was set to 0.00216 meters per second (m/s) and the peak load was measured. This test was performed on specimens after 1 day and 7 days of aging.

Figure 2:
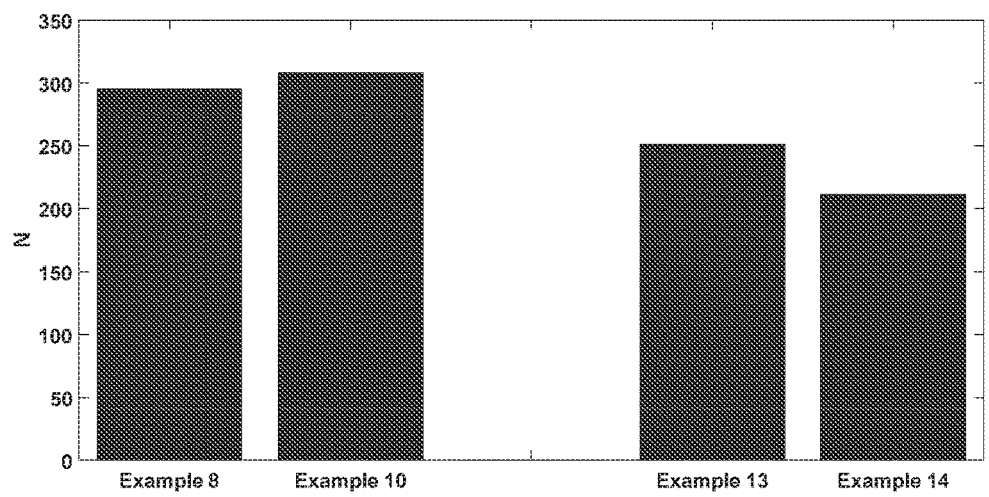
FIG. 2 shows bond strength results for contact adhesive formulations according to the examples.
Figure 3:
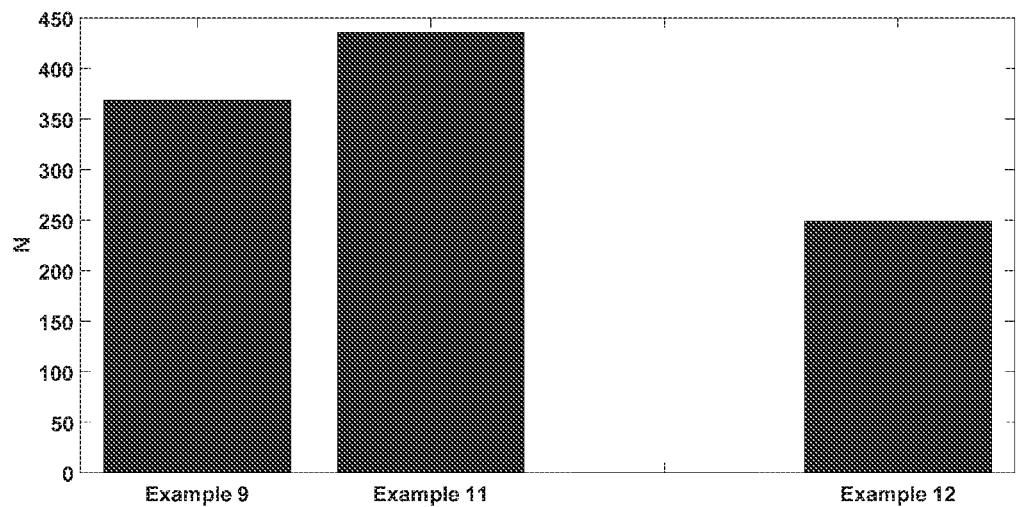
FIG. 3 shows bond strength results for contact adhesive formulations according to the examples.
Figure 4:
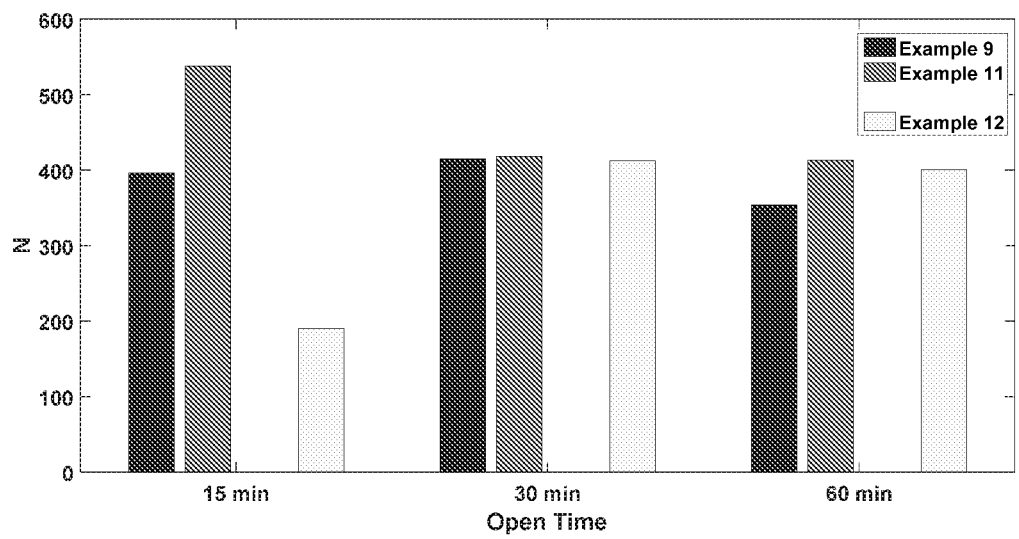
FIG. 4 shows bond strength results for contact adhesive formulations according to the examples after seven days of aging.
Figure 5:
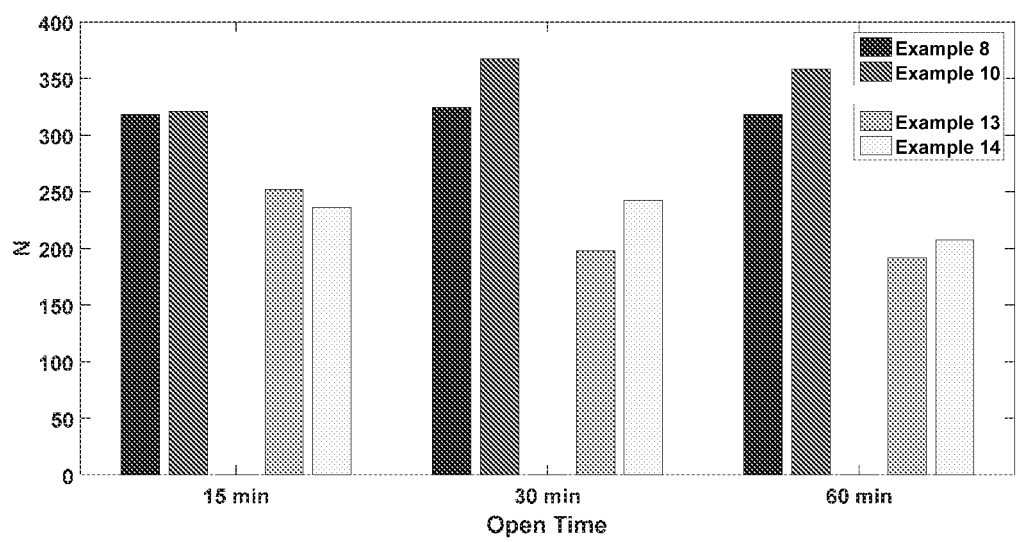
FIG. 5 shows bond strength results for contact adhesive formulations according to the examples after seven days of aging.

After 1 day, the samples that were bonded after 10 minutes were tested. The bond strength was assessed by testing the specimens in cleavage and the peak load was measured. The results are shown in FIG. 2 (for contact adhesive formulations according to examples 8, 10, and 13-14) and FIG. 3 (for contact adhesive formulations according to examples 9, 11, and 12). FIGS. 2 and 3 indicate that the open time for each adhesive occurs within ten minutes so the contact adhesives incorporating the solvent compositions described herein can be used to bond surfaces quickly and efficiently. Samples that were bonded after 15 minutes, 30 minutes, and 60 minutes were tested to assess bond strength after 7 days of aging. The results are shown in FIG. 4 (for contact adhesive formulations according to examples 9, 11, and 12) and FIG. 5 (for contact adhesive formulations according to examples 8, 10, and 13-14), indicating good bond strength after 7 days of aging was achieved for all samples.

The compositions and methods of the present disclosure include at least the following embodiments.

Embodiment 1: A solvent composition comprising, based on the total volume of the solvent composition, 10 to 95 volume percent of a first solvent, wherein the first solvent has Hansen solubility parameters of: $15\ \text{MPa}^{0.5} \leq \delta_D \leq 17\ \text{MPa}^{0.5}$, $4 \leq \delta_P \leq 10.5\ \text{MPa}^{0.5}$, and $7 \leq \delta_H \leq 10\ \text{MPa}^{0.5}$; 5 to 95 volume percent of a second solvent, wherein the second solvent has Hansen solubility parameters of: $16\ \text{MPa}^{0.5} \leq \delta_D \leq 17.5\ \text{MPa}^{0.5}$, $0 \leq \delta_P \leq 3\ \text{MPa}^{0.5}$, and $0 \leq \delta_H \leq 3\ \text{MPa}^{0.5}$; and 0 to 85 volume percent parachlorobenzotrifluoride; wherein the amounts of the first solvent, the second solvent, and parachlorobenzotrifluoride sum to at least 85 volume percent.

Embodiment 2: A solvent composition comprising, based on the total volume of the solvent composition, 10 to 95 volume percent of a first solvent, wherein the first solvent consists essentially of methyl acetate, acetone, dimethyl carbonate, ethyl acetate, n-butylamine, propyl acetate, tetrahydrofuran, or a combination thereof; 5 to 95 volume percent of a second solvent, wherein the second solvent consists essentially of cyclohexene, cyclohexane, cyclopentane, methylcyclohexane, or a combination thereof; and 0 to 85 volume percent parachlorobenzotrifluoride; wherein the amounts of the first solvent, the second solvent, and parachlorobenzotrifluoride sum to at least 85 volume percent.

Embodiment 3: The solvent composition of embodiment 1 or 2, wherein the first solvent consists essentially of methyl acetate, acetone, or a combination thereof, and wherein the second solvent consists essentially of cyclohexene, cyclohexane, methylcyclohexane, or a combination thereof.

Embodiment 4: The solvent composition of any one of embodiments 1 to 3, comprising based on the total volume of the solvent composition, 10 to 76 volume percent methyl acetate; 24 to 90 volume percent cyclohexene; and 0 to 66 volume percent methylcyclohexane; wherein the amounts of methyl acetate, cyclohexene, and methylcyclohexane sum to at least 90 volume percent.

Embodiment 5: The solvent composition of any one of embodiments 1 to 3, comprising based on the total volume of the solvent composition, 6 to 72 volume percent methyl acetate; and 28 to 84 volume percent cyclohexene; wherein the amounts of methyl acetate and cyclohexene sum to at least 90 volume percent.

Embodiment 6: The solvent composition of any one of embodiments 1 to 3, comprising based on the total volume of the solvent composition, 23 to 59 volume percent acetone; and 41 to 77 volume percent cyclohexane; wherein the amounts of acetone and cyclohexane sum to at least 90 volume percent.

Embodiment 7: The solvent composition of any one of embodiments 1 to 3, comprising based on the total volume of the solvent composition, 9 to 66 volume percent methyl acetate; 4 to 61 volume percent acetone; and 30 to 87 volume percent cyclohexane; wherein the amounts of methyl acetate, acetone, and cyclohexane sum to at least 90 volume percent.

Embodiment 8: The solvent composition of any one of embodiments 1 to 3, comprising based on the total volume of the solvent composition, 8 to 80 volume percent methyl acetate; 9 to 78 volume percent cyclohexane; and 11 to 83 volume percent parachlorobenzotrifluoride; wherein the amounts of methyl acetate, acetone, cyclohexane, and parachlorobenzotrifluoride sum to at least 90 volume percent.

Embodiment 9: The solvent composition of any one of embodiments 1 to 8, wherein the solvent composition comprises less than or equal to 1 volume percent of methylene chloride, hexane, toluene, or a combination thereof.

Embodiment 10: An adhesive composition comprising, based on the total weight of the adhesive composition, 40 to 93 weight percent of a solvent composition of any one of embodiments 1 to 9; 5 to 30 weight percent of a rubber; 0 to 30 weight percent of a tackifying resin; and 0 to 10 weight percent of an additive.

Embodiment 11: The adhesive composition of embodiment 10, wherein the rubber comprises polychloroprene, poly(styrene)-poly(isoprene)-poly(styrene), poly(styrene)-poly(butadiene)-poly(styrene), poly(styrene)-poly(ethylene)-poly(butadiene)-poly(styrene), poly(styrene)-poly(ethylene)-poly(propylene)-poly(styrene), natural rubber, synthetic polyisoprene, polybutadiene, poly(isobutylene-co-isoprene), polychloroprene, poly(ethylene-co-propylene), poly(styrene-co-isoprene-co-butadiene), poly(isoprene-co-butadiene), poly(ethylene-co-propylene-co-diene), polysulfide rubber, acrylic rubber, urethane rubber, silicone rubber, nitrile rubber, epichlorohydrin rubber, acrylonitrile-butadiene-styrene polymers, or a combination thereof; and the tackifying resin is a hydrocarbon resin, a phenolic resin, or a combination thereof.

Embodiment 12: The adhesive composition of embodiment 10 or 11, wherein the additive is present and comprises propellants, antioxidants, thickeners, corrosion inhibitors, surfactants, preservatives, dyes, pigments, fillers, curatives, fragrances, activators, or a combination thereof.

Embodiment 13: The adhesive composition of any one of embodiments 10 to 12, comprising based on the total weight of the adhesive composition: 55 to 90 weight percent of the solvent composition, wherein the solvent composition comprises, based on the total volume of the solvent composition, 10 to 76 volume percent methyl acetate; 24 to 90 volume percent cyclohexene; and 0 to 64 volume percent methyl cyclohexane; wherein the amounts of methyl acetate, cyclohexene, and methyl cyclohexane sum to at least 90 volume percent; 5 to 20 weight percent of the rubber, wherein the rubber comprises polychloroprene, poly(styrene)-poly(isoprene)-poly(styrene), poly(styrene)-poly(butadiene)-poly(styrene), or a combination thereof; 5 to 25 weight percent of the tackifying resin, wherein the tackifying resin comprises a hydrocarbon resin, a phenolic resin, or a combination thereof; and 0 to 10 weight percent of the additive.

Embodiment 14: The adhesive composition of any one of embodiments 10 to 12, comprising based on the total weight of the adhesive composition: 55 to 75 weight percent of the solvent composition, wherein the solvent composition comprises, based on the total volume of the solvent composition, 10 to 78 volume percent methyl acetate; 22 to 71 volume percent cyclohexene; and 0 to 68 volume percent methylcyclohexane; wherein the amounts of methyl acetate, cyclohexene, and methylcyclohexane sum to at least 90 volume percent; 10 to 20 weight percent of the rubber, wherein the rubber comprises poly(styrene)-poly(isoprene)-poly(styrene), poly(styrene)-poly(butadiene)-poly(styrene), or a combination thereof; 15 to 25 weight percent of the tackifying resin, wherein the tackifying resin comprises a hydrocarbon resin; and 0 to 10 weight percent of the additive.

Embodiment 15: The adhesive composition of any one of embodiments 10 to 12, comprising based on the total weight of the adhesive composition: 55 to 90 weight percent of the solvent composition, wherein the solvent composition comprises, based on the total volume of the solvent composition, 6 to 72 volume percent methyl acetate; and 28 to 94 volume percent cyclohexene; wherein the amounts of methyl acetate and cyclohexene sum to at least 90 volume percent; 5 to 20 weight percent of the rubber, wherein the rubber comprises polychloroprene, poly(styrene)-poly(isoprene)-poly(styrene), poly(styrene)-poly(butadiene)-poly(styrene), or a combination thereof; 5 to 25 weight percent of the tackifying resin, wherein the tackifying resin comprises a hydrocarbon resin, a phenolic resin, or a combination thereof; and 0 to 10 weight percent of the additive.

Embodiment 16: The adhesive composition of any one of embodiments 10 to 12, comprising based on the total weight of the adhesive composition: 55 to 75 weight percent of the solvent composition, wherein the solvent composition comprises, based on the total volume of the solvent composition, 17 to 74 volume percent methyl acetate; and 26 to 83 volume percent cyclohexene; wherein the amounts of methyl acetate and cyclohexene sum to at least 90 volume percent; 10 to 20 weight percent of the rubber, wherein the rubber comprises poly(styrene)-poly(isoprene)-poly(styrene), poly(styrene)-poly(butadiene)-poly(styrene), or a combination thereof; 15 to 25 weight percent of the tackifying resin, wherein the tackifying resin comprises a hydrocarbon resin; and 0 to 10 weight percent of the additive.

Embodiment 17: The adhesive composition of any one of embodiments 10 to 12, comprising based on the total weight of the adhesive composition: 80 to 93 weight percent of the solvent composition, wherein the solvent composition comprises, based on the total volume of the solvent composition, 23 to 59 volume percent acetone; and 41 to 77 volume percent cyclohexane; wherein the amounts of acetone and cyclohexene sum to at least 90 volume percent; 5 to 18 weight percent of the rubber, wherein the rubber comprises a polychloroprene rubber; 2 to 15 weight percent of the tackifying resin, wherein the tackifying resin comprises a phenolic resin; and 0 to 10 weight percent of the additive.

Embodiment 18: The adhesive composition of any one of embodiments 10 to 12, comprising 60 to 77 weight percent of the solvent composition, wherein the solvent composition comprises, based on the total volume of the solvent composition, 9 to 66 volume percent methyl acetate; 4 to 61 volume percent acetone; and 30 to 87 volume percent cyclohexane; wherein the amounts of methyl acetate, acetone, and cyclohexane sum to at least 90 volume percent; 15 to 25 weight percent of a rubber comprising poly(styrene)-poly(isoprene)-poly(styrene), poly(styrene)-poly(butadiene)-poly(styrene), or a combination thereof; 8 to 18 weight percent of a hydrocarbon resin; and 0 to 10 weight percent of an additive.

Embodiment 19: The adhesive composition of any one of embodiments 10 to 12, comprising based on the total weight of the adhesive composition: 60 to 75 weight percent of the solvent composition, wherein the solvent composition comprises, based on the total volume of the solvent composition, 8 to 80 volume percent methyl acetate; 9 to 78 volume percent cyclohexane; and 11 to 83 volume percent parachlorobenzotrifluoride; wherein the amounts of methyl acetate, cyclohexane, and parachlorobenzotrifluoride sum to at least 90 volume percent; 15 to 25 weight percent of the rubber, wherein the rubber comprises poly(styrene)-poly(isoprene)-poly(styrene), poly(styrene)-poly(butadiene)-poly(styrene), or a combination thereof; 10 to 20 weight percent of the tackifying resin, wherein the tackifying resin comprises a hydrocarbon resin; and 0 to 10 weight percent of an additive.

Embodiment 20: A method of bonding a first surface and a second surface, the method comprising, applying a first adhesive composition according to any one of embodiments 10 to 19 to at least a portion of the first surface; applying a second adhesive composition according to any one of embodiments 10 to 19 to at least a portion of the second surface; and contacting the first adhesive composition applied to the first surface and the second adhesive composition applied to the second surface; wherein the first surface and the second surface each independently comprise wood, ceramic, concrete, glass, particleboard, fiberboard, high pressure laminate, metal, leather, a textile, a polymer, cork, upholstery, linoleum, or a combination thereof.

This written description uses examples to disclose the various embodiments of the disclosure, including the best mode, and also to enable any person skilled in the art to make and use the disclosure. A patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference. Unless defined otherwise, technical and scientific terms used herein have the same meaning as is commonly understood by one of skill in the art to which this invention belongs.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). "Or" means "and/or" unless clearly indicated otherwise by context. The term "combination" is inclusive of blends, mixtures, alloys, reaction products, and the like. Also, "a combination thereof" means that the list is inclusive of each element individually, as well as combinations of two or more elements of the list, and combinations of at least one element of the list with like elements not named. "Optional" or "optionally" means that the subsequently described event or circumstance may or may not occur, and that the description includes instances where the event occurs and instances where it does not.

Reference throughout the specification to "an embodiment", "another embodiment", "some embodiments", and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

Unless specified to the contrary herein, all test standards are the most recent standard in effect as of the filing date of this application, or, if priority is claimed, the filing date of the earliest priority application in which the test standard appears.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A solvent composition consisting of, based on the total volume of the solvent composition,
    10 to 95 volume percent of a first solvent, wherein the first solvent has Hansen solubility parameters of:
        15 MPa$^{0.5}$≤$\delta_D$≤17 MPa$^{0.5}$, 4≤$\delta_P$≤10.5 MPa$^{0.5}$, and 7≤$\delta_H$≤10 MPa$^{0.5}$;
    5 to 95 volume percent of a second solvent, wherein the second solvent has Hansen solubility parameters of:
        16 MPa$^{0.5}$≤$\delta_D$≤17.5 MPa$^{0.5}$, 0≤$\delta_P$≤3 MPa$^{0.5}$, and 0≤$\delta_H$≤3 MPa$^{0.5}$;
    and
    greater than 0 to 85 volume percent parachlorobenzotrifluoride.

2. A solvent composition consisting of, based on the total volume of the solvent composition,
    10 to 95 volume percent of a first solvent, wherein the first solvent consists essentially of methyl acetate, acetone, dimethyl carbonate, ethyl acetate, n-butylamine, propyl acetate, tetrahydrofuran, or a combination thereof;
    5 to 95 volume percent of a second solvent, wherein the second solvent consists essentially of cyclohexene, cyclohexane, cyclopentane, methylcyclohexane, or a combination thereof; and
    greater than 0 to 85 volume percent parachlorobenzotrifluoride.

3. The solvent composition of claim 2, wherein the first solvent consists essentially of dimethyl carbonate and optionally includes methyl acetate, acetone, or a combination thereof, and wherein the second solvent consists essentially of cyclohexane and optionally includes cyclohexene, methylcyclohexane, or a combination thereof.

4. The solvent composition of claim 2, comprising based on the total volume of the solvent composition,
    10 to 76 volume percent methyl acetate;
    24 to 90 volume percent cyclohexene; and
    0 to 66 volume percent methylcyclohexane;
    wherein the amounts of methyl acetate, cyclohexene, and methylcyclohexane sum to at least 90 volume percent.

5. The solvent composition of claim 2, comprising based on the total volume of the solvent composition,
    6 to 72 volume percent methyl acetate; and
    28 to 84 volume percent cyclohexene;
    wherein the amounts of methyl acetate and cyclohexene sum to at least 90 volume percent.

6. The solvent composition of claim 2, comprising based on the total volume of the solvent composition,
    23 to 59 volume percent acetone; and
    41 to 77 volume percent cyclohexane;
    wherein the amounts of acetone and cyclohexane sum to at least 90 volume percent.

7. The solvent composition of claim 2, comprising based on the total volume of the solvent composition,
    9 to 66 volume percent methyl acetate;
    4 to 61 volume percent acetone; and
    30 to 87 volume percent cyclohexane;
    wherein the amounts of methyl acetate, acetone, and cyclohexane sum to at least 90 volume percent.

8. The solvent composition of claim 2, comprising based on the total volume of the solvent composition,
    8 to 80 volume percent methyl acetate;
    9 to 78 volume percent cyclohexane; and
    11 to 83 volume percent parachlorobenzotrifluoride;
    wherein the amounts of methyl acetate, acetone, cyclohexane, and parachlorobenzotrifluoride sum to at least 90 volume percent.

* * * * *